United States Patent [19]

Golden et al.

[11] Patent Number: 4,793,051
[45] Date of Patent: Dec. 27, 1988

[54] METHOD FOR CONSTRUCTION OF CRIMP SEAL PLEATED FILTER ASSEMBLY

[75] Inventors: Patrick Golden; Daniel T. Risch, both of Minneapolis, Minn.; Steve W. Sabelko, Prescott, Wis.

[73] Assignee: Donaldson Company, Inc., Minneapolis, Minn.

[21] Appl. No.: 55,937

[22] Filed: Jul. 20, 1987

Related U.S. Application Data

[62] Division of Ser. No. 862,772, May 13, 1986, Pat. No. 4,736,518.

[51] Int. Cl.$^4$ .............................................. B23P 19/02
[52] U.S. Cl. ........................................ 29/525; 29/902
[58] Field of Search .................... 72/381, 382, 385; 29/419 R, 163.5 F, 432.1, 457, 469, 525; 55/521; 210/493.3, 493.1, 493.5

[56] References Cited

U.S. PATENT DOCUMENTS

| | | | |
|---|---|---|---|
| 3,315,336 | 4/1967 | Parker et al. | 29/419 X |
| 3,434,400 | 3/1969 | Hochfeld | 72/381 X |
| 3,631,582 | 1/1972 | Lucas | 29/419 |
| 3,641,803 | 2/1972 | Schuurbiers et al. | 72/381 |
| 3,851,518 | 12/1974 | Spengler | 72/381 X |
| 4,617,122 | 10/1986 | Kruse et al. | |

FOREIGN PATENT DOCUMENTS

| | | | |
|---|---|---|---|
| 191314 | 8/1937 | Switzerland | 72/382 |
| 321308 | 1/1972 | U.S.S.R. | 72/385 |
| 197702 | 2/1977 | U.S.S.R. | 72/385 |
| 786532 | 11/1957 | United Kingdom | |

Primary Examiner—Howard N. Goldberg
Assistant Examiner—Joseph M. Gorski
Attorney, Agent, or Firm—Merchant, Gould, Smith, Edell, Welter & Schmidt

[57] ABSTRACT

A method and apparatus are disclosed for providing a crimp seal pleated filter assembly having a two piece housing with a filter media disposed within the housing and having a plurality of alternating pleats. The apparatus includes a first and second jig for supporting the housing halves and an odd number of at least three or more movable pleat forming blades on one side of the apparatus. The odd number of blades are movable through one of the supporting jigs with blade edges opposing the other supporting jig. The odd number of blades includes an independently movable center blade and a first pair of outer blades with opposing surfaces of adjacent blades defining a first plurality of pleat forming spaces. An even number of pleat forming blades are positioned with blade edges opposing the first plurality of pleat forming spaces and are spaced apart from and in alignment with the opposing pleat forming blades. The even number of pleat forming blades includes at least a pair of center blades which project through the other supporting jig during pleat formation and define a pleat forming space in which a first center pleat is formed. The blades and the jigs are moved toward one another in a predetermined sequence for the blades to form desired pleats within a filter media and for the jigs to urge the filter housing around the pleated filter media to crimp seal and encapsulate the media within the housing.

6 Claims, 9 Drawing Sheets

METHOD FOR CONSTRUCTION OF CRIMP SEAL PLEATED FILTER ASSEMBLY

This is a division of application Ser. No. 862,772, filed May 13, 1986, now U.S. Pat. No. 4,736,518.

TECHNICAL FIELD

The present invention relates to an apparatus and method for making a small filter assembly including a pleated filter media which is crimp sealed and encapsulated by opposite halves of the filter assembly housing. The filter assembly made by the method and apparatus of the present invention is intended for use in environments where an extremely high degree of filtration is required in a relatively small space.

BACKGROUND OF THE INVENTION

In the computer field for example, there is a need to provide filtration within the sealed enclosures of hard or "Winchester" disk drives. Hard disk drives have an inflexible platter coated with magnetic material which is spun very rapidly. A magnetic read/write head "flies" only a few microns above the disk on an air cushion. If particulate matter were to become lodged between the disk and the head, the disk drive would be destroyed. On the other hand, there is no space for large or sophisticated filtration equipment within the drive since it is a requirement to make the drives as small as possible.

The two requirements of high efficiency and limited space tend to conflict; therefore, special techniques are required to produce a filter assembly. A pleated filter media which maintains proper pleat spacing, maximizing capacity of the filter and also exhibits minimum loss of media fiber is shown in U.S. Pat. No. 4,617,122 to Donaldson Company, the assignee thereof.

The predominant apparatus for making pleated filter media is the rotary type pleater. The rotary type apparatus pleats media by passing a sheet of filter paper between a pair of rollers including a plurality of scoring tools having scoring blades or knifes at the outer periphery thereof adjacent the outer periphery of the rollers. The scoring blades irreversibly indent or crease the media forming lines along which the media is folded to form pleats. Other known pleating devices also score the filter media during formation of the pleated media.

While the scoring process is acceptable for forming pleated filter media useful in some applications, scoring produces a number of undesirable drawbacks when relied on to form pleated media for certain high efficiency applications. For example, scoring fractures or breaks the continuous fiber structure of the filter media creating areas where undesirable impurities can leak through the media. In many cases, a protective layer of synthetic material such as polyester or nylon (i.e. scrim) is laid over the media to compensate, in part, for the damage to the media caused by the scoring process. The inclusion of scrim on the media surface; however, requires additional handling steps and increases costs.

Accordingly, there is a need for an apparatus and method which can produce a pleated filter assembly designed for use in environments requiring high efficiency filtration. The present invention meets this need by providing a filter assembly including filter media exhibiting minimal disruption of its fiber structure. The apparatus and method of the present invention also require a minimum number of steps to produce a complete filter assembly; thereby minimizing damage and contamination to the media resulting from multiple handling of the media during production.

SUMMARY OF THE INVENTION

In the apparatus and method of the present invention a small filter assembly exhibiting enhanced efficiency and minimal fiber loss is produced by pleating a sheet of filter media between two halves of a filter assembly housing. Subsequent to pleating the media the two housing halves are brought into final engagement to crimp seal and encapsulate the filter media, in the assembly housing. in accordance with the present invention, pleats are formed exclusively by folding the media between cooperatively aligned edges of pleat forming blades positioned on opposing sides of the apparatus.

The apparatus of the present invention includes a pair of opposing supporting jigs cooperatively aligned with each other to accommodate a base half and frame half of a two piece filter housing therein. A plurality of an odd number of at least three or more pleat forming first blades are positioned on one side of the apparatus and are moveable through one of the two supporting jigs with blade edges opposing the other supporting jig. The odd number of first blades includes an independently moveable center blade and at least a first pair of outer blades having one blade on each side of the center blade. Each set of adjacent blades define a pleat forming space therebetween. A plurality of an even number of pleat forming second blades are positioned on the opposite side of the apparatus with blade edges opposing the pleat forming spaces defined by the first blades. The even number of pleat forming second blades includes at least a pair of center blades defining a pleat forming space therebetween. These paired center second blades project through the other supporting means and engagingly cooperate with the moveable center first blade. Opposing blades on each side of the apparatus are cooperatively aligned with each other for formation of additional pleats. Particularly, the outer first blades and paired center second blades are aligned with each other to form a first pair of adjacent pleats on each side of the center pleat. Further pleats may be formed by additional pairs of cooperating blades on each side of the apparatus. A pair of end pleats are formed by a final pair of blades and the oppositely positioned side blades of the base half of the assembly housing. At least one of the supporting jigs is moveable toward the other to accomplish formation of the end pleats and assemble the housing halves with the filter media crimp sealed and encapsulated therein.

In a preferred embodiment, three slidable pleat forming blades, including a slidable center blade cooperate with an opposing pair of fixedly mounted center blades to form a center pleat and a first pair of outer pleats adjacent the center pleat. End pleats are formed by the outer slidable pleat forming blades and the side wall blades of the base half of the housing. Preferably, both supporting jigs are slidable to improve the inefficiency of the assembly process.

According to the apparatus and method of the present invention a filter assembly having a crimp sealed and encapsulated pleated filter element is produced in a minimum number of steps. First, the base half and frame halves of a two piece filter assembly housing are positioned on cooperatively aligned opposing jigs. Second, a center pleat is formed in a sheet of filter media positioned between the jigs by folding the media between a moveable center pleating blade having an edge extending toward the media from one of the two supporting jigs and an opposing pair of pleating blades having edges extending from the other supporting jig. Third, additional pleats are formed by folding the media between opposite pleating blade edges extending toward the media from each of the respective supporting jigs. Prior to completion of the last pair of pleats, the two halves of the filter housing are brought into near engagement to prevent fracturing the media at the outboard pleats during final engagement of the two housing halves. Fourth, the two body halves are pushed together into final engagement to complete the filter assembly by crimp sealing and encapsulating the filter media therein. Finally, the blades and supporting jigs are separated to allow removal of the finished filter assembly.

The apparatus and method of the present invention exhibit a number of advantages over existing devices and methods used to make pleated filter assemblies. According to the method and apparatus of the present invention, fiber breakage and pleat tip fracturing is minimized, thereby enhancing media efficiency and eliminating the need for scrim in many cases. Delamination of the media is also minimized by not scoring the media.

The present invention further reduces damage to the filter media by requiring a minimum number of steps and eliminating multiple handling during the assembly process. The number of operators and assembly time necessary to produce a pleated filter assembly are greatly reduced when the present apparatus and method are used. Further, the method of pleat formation and filter assembly according to the present invention are simple enough to be incorporated into either a manual or automated apparatus.

These and various other advantages and features of novelty which characterize the invention are pointed out with particularly in the claims annexed hereto and forming a part hereof. However, for a better understanding of the invention, its advantages and objects attained by its use, reference should be had to the drawings which form a further part hereof, and to the accompanying descriptive matter, in which there is illustrated and described a preferred embodiment of the invention.

DETAILED DESCRIPTION OF A PREFERRED EMBODIMENT

Referring to the drawings, an apparatus is shown for the construction of a crimp seal pleated filter assembly such as described in commonly assigned U.S. Pat. No. 4,617,122.

With reference to the numeral designation in the aforesaid patent, the filter assembly includes a filter assembly housing which is formed from a female or frame half 40 and a male or base half 20. The frame half 40 is a rectangular box defined by a pair of side walls 43 each provided with a plurality of triangular shaped projections 50 extending outwardly from and adjacent to the opposing surfaces of the side walls 43. The frame half also includes front and back walls 42 and 44 which join side walls 43 to form the open rectangular box shape of frame half 40. The base half 20 also has an open rectangular shape which is sized to cooperate with the frame half 40 to define a completed housing body. Base half 20 has opposing side walls 23 each of which is provided with a plurality of triangular shaped projections 30 which are sized to be received between projections 50 when base half 20 and frame half 40 are joined. The base half 20 also includes a pair of side walls blades 26 connecting walls 23. Base half 20 also includes a cross wall 34 extending between side wall blades 26 intermediate walls 23.

As also disclosed in the aforementioned U.S. Pat. No. 4,617,122, the filter assembly includes a filter media 60 which is sealed and encapsulated between the base 20 and the frame 40. The filter media 60 is accordian folded within the housing defined by the joined base half 20 and frame half 40 with the structure of the completed filter assembly being more fully described in the aforesaid United States patent application. The present invention is for an apparatus and method for making a completed filter assembly from a base half 20, a frame half 40 and a sheet 60 of filter media as described. It is to be understood that while the apparatus and method of the present invention described herein is used to make rectangular filter assemblies of the type described above, one skilled in the art can apply the principles of the present invention to make filter assemblies having various shapes (i.e. square, trapezoid, etc.).

Figure 1:
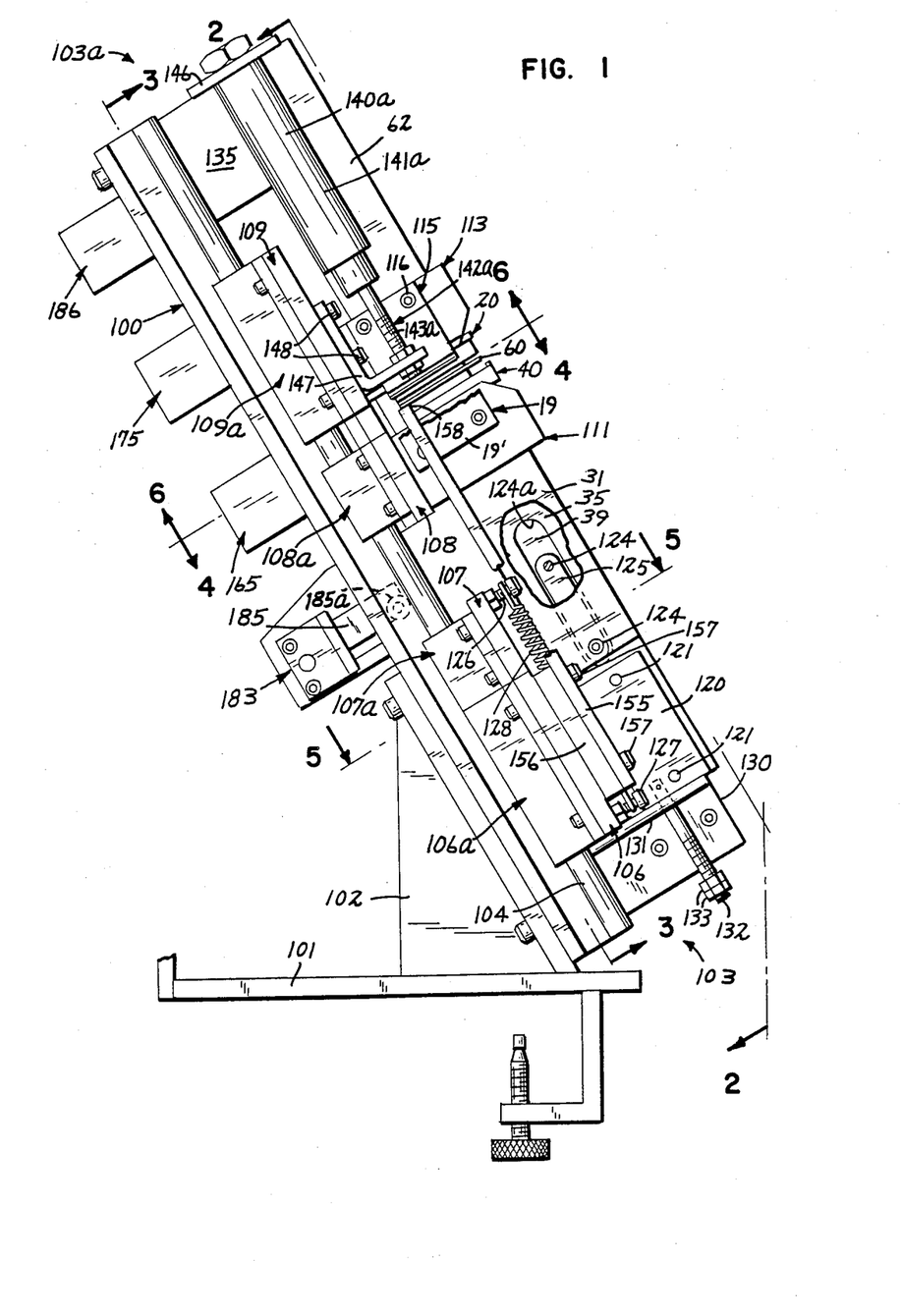
FIG. 1 is a side elevational view of a preferred embodiment of an apparatus incorporating the principles of the present invention.

Referring to FIG. 1, the apparatus of the present invention includes a flat support plates 100 which is rigidly secured to a horizontal fixed support 101 by a mounting bracket 102 with the support plate 100 being maintained in an inclined position and with the apparatus extending from a lower first end 103 to an upper second end 103a. Best seen in FIGS. 3-7, the fixed support plates 100 has a pair of spaced apart parallel aligned rails including a first rail 104 on a left-hand side of the apparatus (when viewed from the front as in FIG. 2) and a second right rail 106. Shown most clearly in FIGS. 1-3, four carriages 106, 107, 108, and 109 are slidably mounted on rails 104 and 105 to move in a direction parallel to the rails 104, 105. Each of the carriages is a generally L-shaped sheet of steel with opposing carriages 106, 107 and opposing carriages 108, 109 aligned such that when the opposing pairs are joined (such as pairs 106 and 107 shown in FIG. 3) the combined carriages form the outline of a square sheet.

Figure 4:
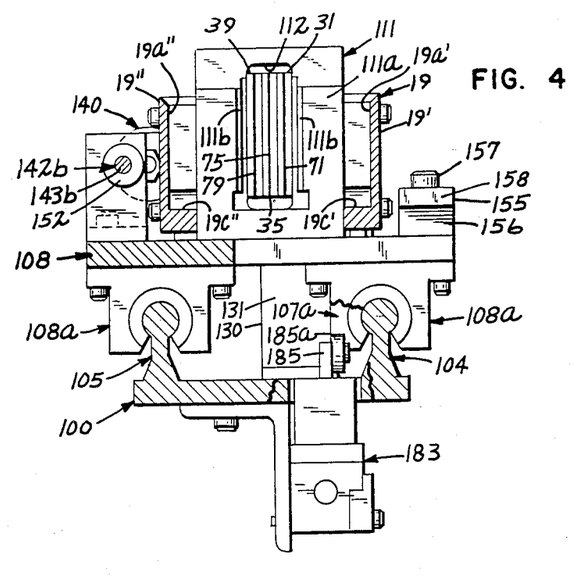
FIG. 4 is a sectional view as seen generally along line 4—4 of FIG. 1.
Figure 5:
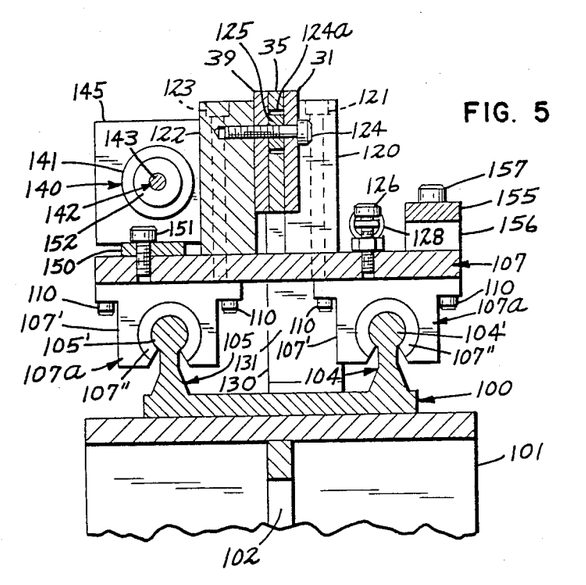
FIG. 5 is a sectional view along line 5—5 of FIG. 1 on an enlarged scale.
Figure 6:
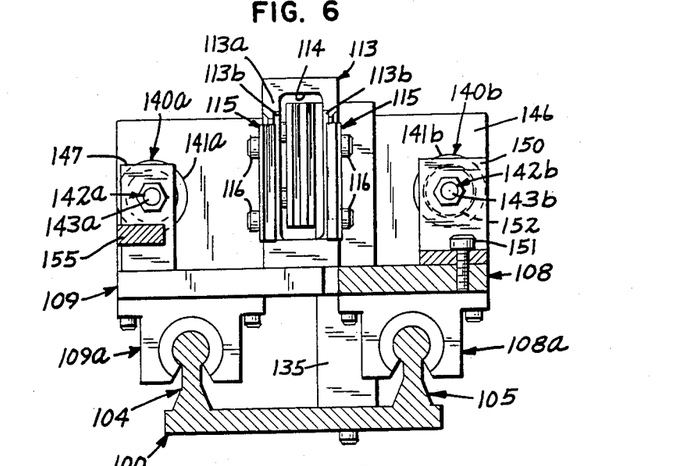
FIG. 6 is a sectional view along line 6—6 of FIG. 1 on an enlarged scale.
Figure 7:
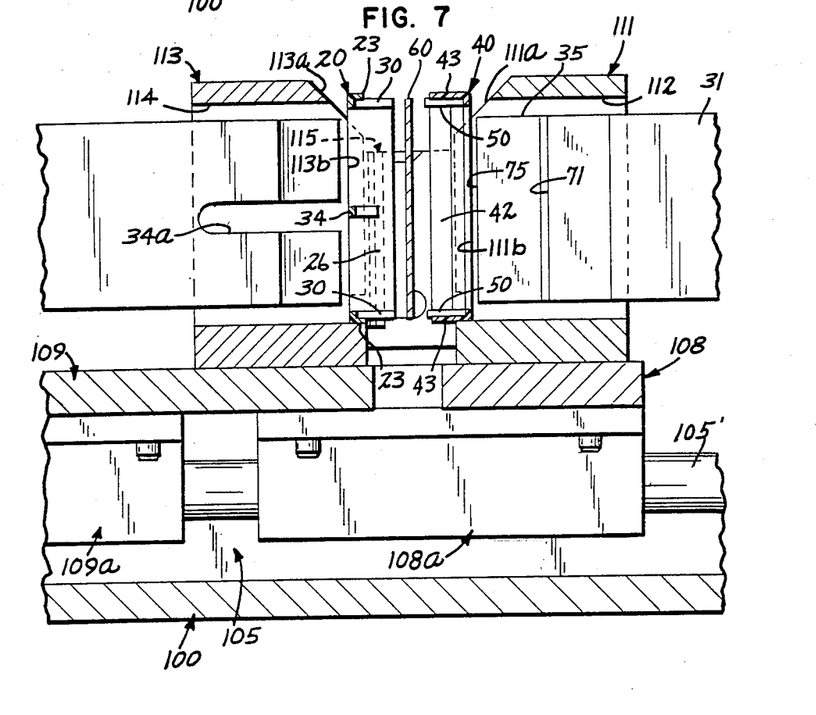
FIG. 7 is sectional along line 7—7 of FIG. 2 on an enlarged scale.
Figure 8:
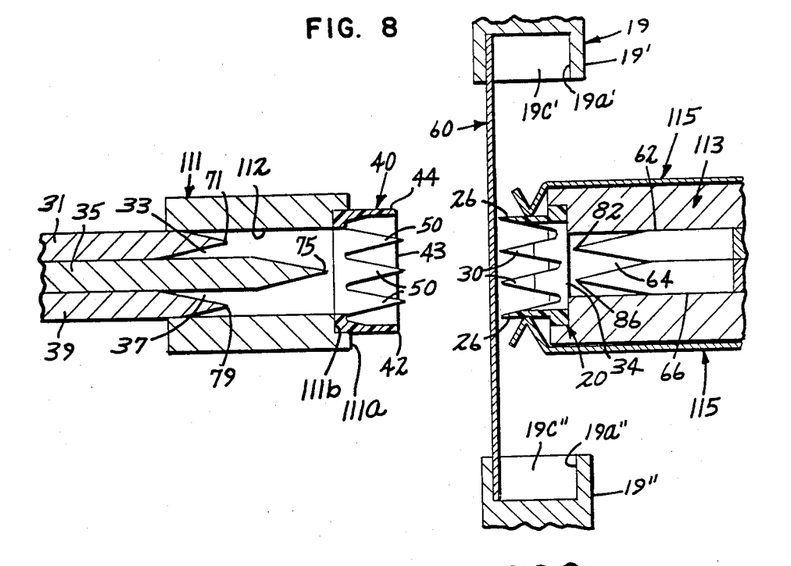
FIGS. 8-14 are diagrammatic sectional views showing a series of sequential steps for formation of a pleated filter assembly using the principles of the present invention.

Each of the carriages 106, 107, 108 and 109 is slidably secured to rails 104, 105 by bearing mechanism 106a, 107a, 108a and 109a, respectively. Bearing mechanisms 106a through 109a are Thompson-type bearings which are conventional and well known. The bearing mechanisms 106a through 109a are schematically shown in FIGS. 4–6. Referring to FIG. 5, a description of bearing mechanism 107a will suffice as a description of all. Bearing 107a includes a housing 107' which houses a bearing assembly 107" sized to receive an elongated rod end 105' of rail 105. The bearing mechanism 107" is a recirculating bearing that permits housing 107' to freely slide along rail 105. Each of the bearing mechanisms are sized to have a length equal to the length of the carriages opposing the rails 104, 105. The bearing assemblies 106a through 109a are secured to the underside of the carriages 106–109 by a plurlity of bolts 110. With the carriages 106–109 secured to rails 104, 105 by bearing assemblies 106a–109a, the carriages are freely slidable along the rails 104, 105.

Referring to FIGS. 1, 2, 4 and 7, a first jig 111 is secured to carriage 108 for movement therewith. Jig 111 is a box having an opening 112 extending in a direction parallel to the direction of sliding motion of carriage 108 with the jig 111 centrally located on an upper surface of carriage 108 between rails 104, 105. A forward or upper end 11a of jig 111 is shaped to receive a frame half 40 with the opening of the box shape of frame half 40 aligned with opening 112 of jig 111. As shown in FIGS. 8–13, frame half 40 is received within a recess 111b formed at forward end 111a. Due to the inclined disposition of the apparatus, frame member 40 may be simply inserted within recess 111b without fear of frame member 40 falling out of the recess, A second jig 113 is secured to carriage 109 for sliding movement therewith with second jig 113 having a box structure similar to that of first jig 112 and presenting an opening 114 therethrough in alignment with opening 112 of jig 111. A lower end 113a of jig 113 is provided with a recess 113b sized to receive a base half 20 with the opening of base half 20 aligned with opening 114 and with base half 20 aligned with frame half 40 for the halves to be joined into a completed filter assembly housing when jigs 11 and 113 are drawn together as will be described. To prevent base half 20 from falling out of recess 113b, a pair of spring clips 115 are provided. Clips 115 are secured to jig 113 by a plurality of bolts 116 with spring clips 115 having clip ends 117 biased to abut side wall blades 26. A leading edge 118 of each of the clips 115 is slanted outwardly away from clip end 117 for the edge 118 to be engaged by walls 42 and 44 as the base and frame members 20 and 40 are urged together as will be described.

Shown best in FIG. 2 and FIGS. 8–14, three movable pleat forming blades 31, 35 and 39 are provided having blade edges 71, 75 and 79, respectively, opposing jig 113. Blade 35 is secured to carriage 106 by means of a mounting block 120 bolted to both carriage 106 and blade 35 by a plurality of bolts 121. Blade 35 is secured perpendicular to carriage 106 and having its length running parallel to tracks 104, 105 with blade 35 extending into the center of the opening 112 through jig 111.

Figure 2:
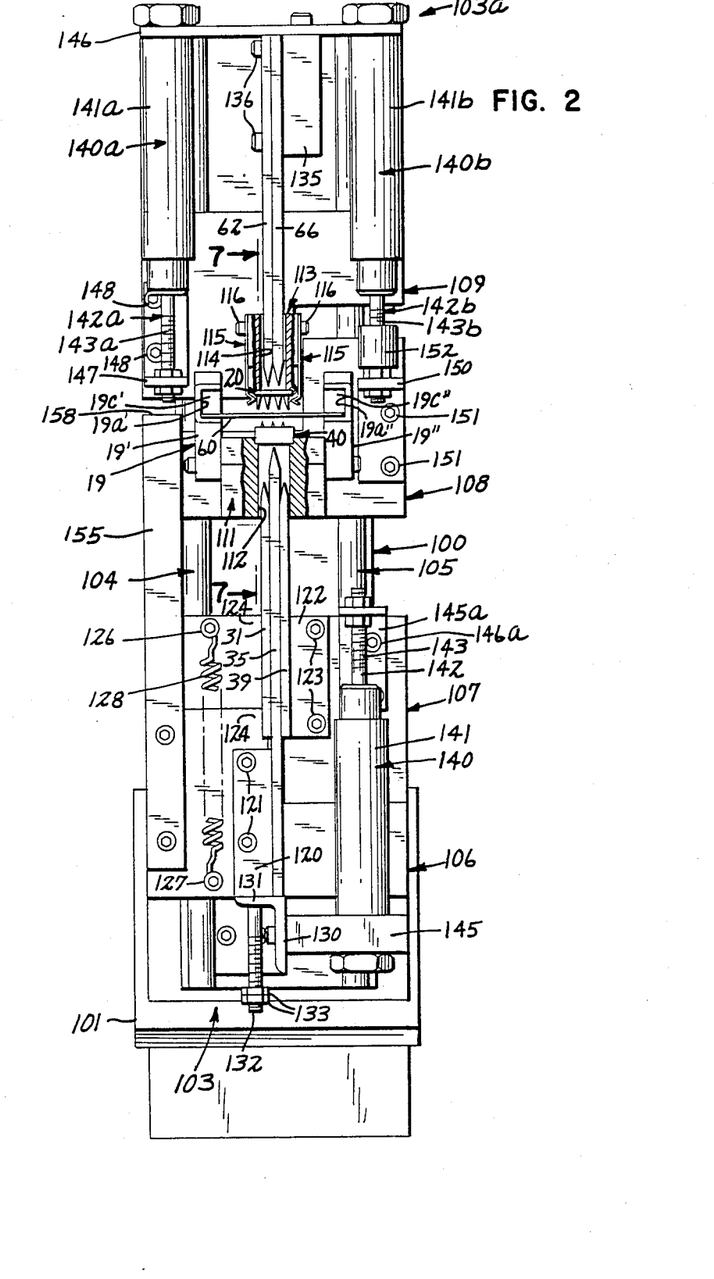
FIG. 2 is plan view as seen generally along line 2—2 of FIG. 1.
Figure 3:
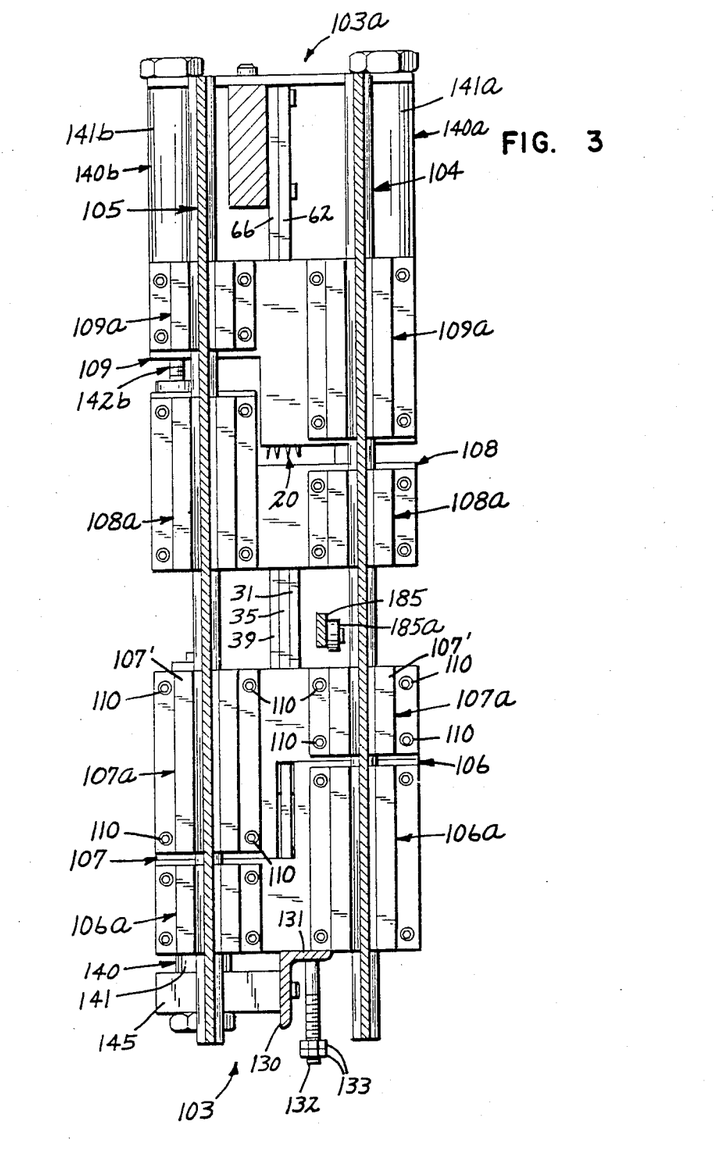
FIG. 3 is a sectional view as seen generally along line 3—3 of FIG. 1.

Blades 31 and 39 constitute a first pair of outer blades which are secured to carriage 107 with outer blades 31 and 39 abutting center blade 35 on opposite sides thereof. Shown best in FIGS. 1, 2 and 5, outer blades 31 and 39 are secured to carriage 107 by means of a mounting block 122 which is bolted to carriage 107 by means of bolts 123 and bolts 124 passing through aligned orifices of outer blades 31 and 39. Shown in FIG. 1, center blade 35 is provided with an elongated slot 124a which receives a spacer block 125 slidably movable therein and slidable a cistonace equal to a desired distance of a relative stroke between center blade 35 and outer blades 31 and 39. As shown in FIG. 2, outer blades 31 and 39 extend from support block 122 in a direction parallel to blade 35 and terminate at blade tips 71, 79 disposed within opening 112.

In a rest position, as shown in FIGS. 1–8, blade tips 71 and 79 are in alignment and spaced rearwardly away from blade tip 75 a distance equal to the desired stroke of relative movement between blades 31, 39 and center blade 35. When the blades are moved the full relative stroke, blade edges 71, 75 and 79 are in alignment with opposing surfaces of adjacent blades defining a plurality of pleat forming spaces 33 and 37. Outer blades 31 and 39 are movable with center blade 35 by means of carriage 107 being coupled to carriage 106 by a spring 128 extending between a first spring post 126 secured to carriage 107 and a second spring post 127 secured to carriage 106 with spring post 126 and 127 being aligned parallel to the direction of movement of the carriages.

A lower fixed stop 130 is secured to fixed plate 100 and has a stop plate 131 abutting mounting block 120. A rod 132 is secured to block 120 and extends through an opening formed through stop plate 131 and terminates at a free end which is provided with position adjustable stop plate engaging nuts 133.

A pair of center blades 62 and 66 are fixedly mounted to support plate 100 by means of a support block 135. The fixed blades are secured to support block 135 by means of bolts 136 passing through blades 62, 66 and securely received within block 135. The blades extend from block 135 to blade edges 82, 86 with the blades 62 and 66 passing into the opening 114 formed through jig 113. Opposing surfaces of blades 62 and 66 define a pleat forming space 64 disposed between edges 82 and 86. Blade edges 82, 86 of fixed center blades 62, 66 are aligned to be opposing the first plurality of pleat forming spaces 33, 37 with the blades 62, 66 sized to be received within spaces 33, 37 and conforming therewith. Likewise, blade 35 at edge 75 is opposing pleat forming space 64 and is sized to be received within space 64 and conform to space 64. Blades 62, 66 are provided with elongated slots 34a (shown in FIG. 7) to accommodate passage of cross wall 34 as blades 62, 66 and base half 20 move relative to one another as will be described. In the preferred embodiment shown the blade edges 71, 75, 79, 82, 86 are tapered and pointed to facilitate proper folding of the media 60.

A filter media support jig 19 is provided comprising a pair of spaced apart arms 19' and 19" which are rigidly secured to support plate 100. Arms 19' and 19" are provided with a pair of opposing and aligned filter media material receiving pockets 19a' and 19a". Filter media material 60 is deposited within the pockets 19a' and 19a" and extends between opposing jigs 111 and 113. The media 60 rests against a lower surface 19c' and 19c" with the pockets 19a' and 18a" being sized to accommodate movement of media 60 away from surfaces 19c' and 19c" in a direction toward jig 113.

Three pneumatic cylinders 140, 140a and 140b are provided to effect desired movement of the various elements of the apparatus of the invention. Each of the pneumatic cylinders is identical and a description of one will suffice as a description of the other. Like elements of each of the pneumatic cylinders are numbered identically with the addition of "a" and "b" to identify the particular cylinder. Shown schematically in FIG. 16, each of the cylinders, such as cylinder 140, includes a cylinder body 141 which receives a reciprocating piston 142 having a rod 143 extending from a piston head 144.

Pneumatic cylinder 140 is secured to the apparatus by its head end being secured ot a mounting bracket 145 and its rod end 143 being secured to carriage 107 by a L-shaped bracket 145a which is bolted to carriage 107 by bolts 146a. Accordingly, as pneumatic cylinder 140 extends, carriage 107 moves away from lower end 103 of the apparatus of the invention.

Cylinder 140a is secured to the apparatus by having its head end secured to a mounting bracket 146 at upper end 103a with bracket 146 rigidly secured to plate 100. The rod end 143a is secured to carriage 109 by means of an L-shaped bracket 147 which is secured to carriage 109 by means of a plurality of bolts 148. With cylinder 140a so secured, carriage 109 moves away from bracket 146 when cylinder 140a is extended. Similarly, cylinder 140b is secured to the apparatus with its head end fixedly secured to mounting bracket 146 and with its piston end 143b secured to carriage 108 by means of an L-shaped bracket 150 which is secured to carriage 108 by means of bolts 151. A position adjustable stop 152 is secured ot piston rod 143b between cylinder housing 141b and L-shaped bracket 150. A push bar 155 is secured to carriage 106 and spaced therefrom a predetermined distance by a spacer block 156 (shown in FIG. 5). The spacer bar 155 is secured to carriage 106 by a plurality of bolts 157 and extends to a free end 158 which opposes L-shaped bracket 147.

Figure 16:
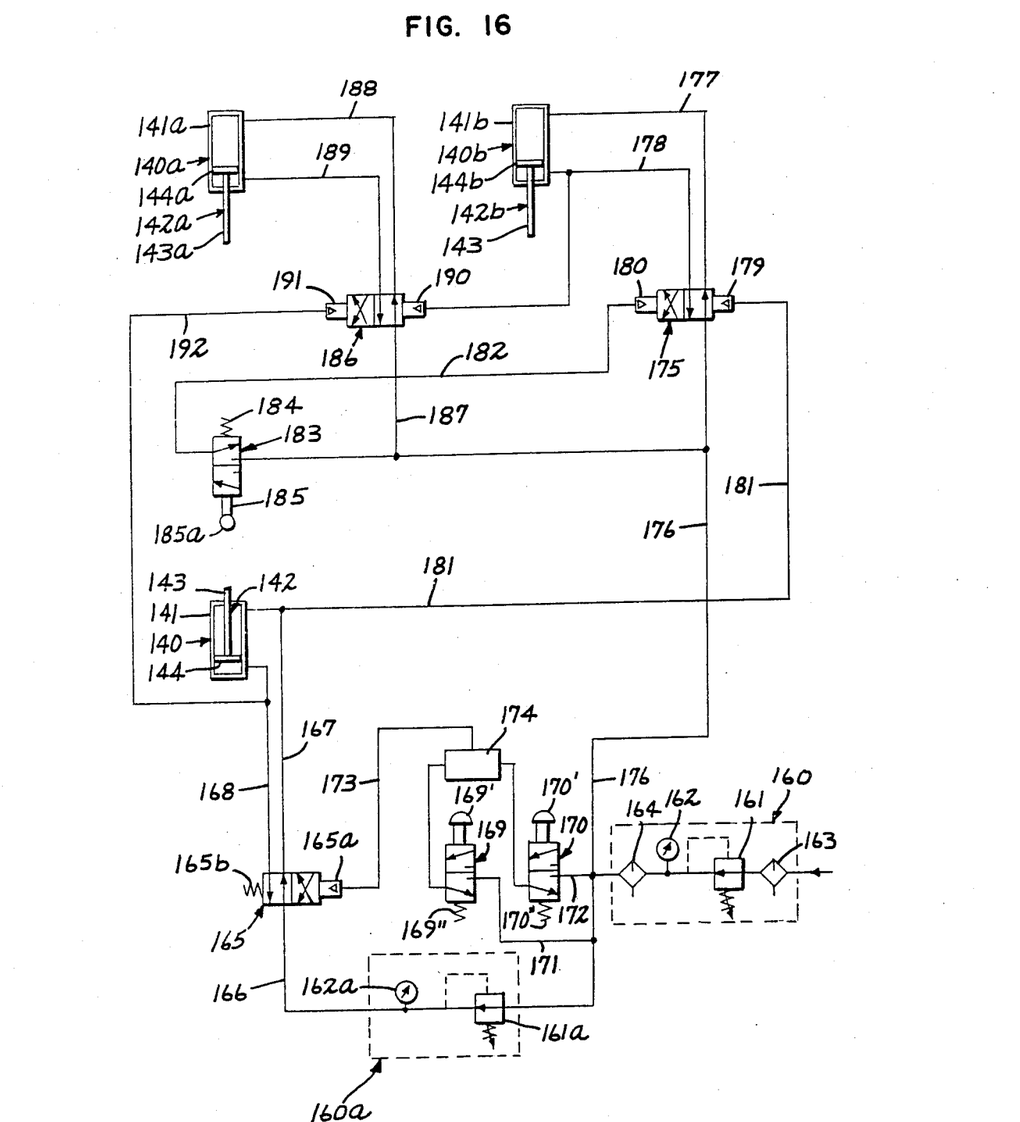
FIG. 16 is a schematic drawing of the fluid flow control system for the preferred embodiment of the apparatus shown in FIGS. 1-7.

A pneumatic circuit (schematically shown in FIG. 16) is provided for controlling movement of the various elements of the apparatus by selectively pressurizing the head or rod ends of pneumatic cylinders 140, 140a and 140b. Referring to FIG. 16, the pneumatic circuit includes a first fluid regulator 160 which is coupled to a source of pressurized air (not shown) and includes a first pressure regulator 161, first pressure gauge 162, a filter 163 and a lubricator 164 all of which are conventional and well known in the art. The circuit includes a plurality of pneumatic valves which are two position valves for alternatively admitting a flow of pressurized fluid to the head or rod end of the pneumatic cylinders to effect extension or retraction of the piston, respectively. Shown in FIG. 16, each of the two position valves are shown in their first positions before initiating a cycle to effect fabrication of a filter assembly. Additionally, in FIGS. 1-7, the apparatus of the invention is shown in the rest position prior to initiating an operating cycle.

Pneumatic cylinder 140 is controlled by first two way valve 165 which has an incoming line 166 in flow communication with the output of first regulator 160. Disposed along line 166 is a second regulator 160a which includes a second pressure regulator 161a and second pressure gauge 162a. Second pressure regulator 161a insures that the pressure of fluid flowing through valve 165 is less than the pressure of the fluid at the output of first regulator 160. As shown in FIG. 16, first two way valve 165 is provided in its first position with fluid flow through the valve directed to an output line 167 in communication with the rod end of cylinder 140. In its second position, first valve 165 directs fluid flow from line 166 to line 168 to pressurize the head end of cylinder 140 and vent the rod end. A spring 165b biases the valve 165 to the rest position.

To shift first valve 165 from tis first position (shown in FIG. 16) to its energized position, two hand operated valves 169 and 170 are provided having input lines 171 and 172 in flow communication with the output of first regulator 160. Valves 169, 170 have engageable handles 169', 170' to urge the valves against the bias of springs 169", 170" to energized positions. Operation of each of valves 169 and 170 by an operator directs flow of pressurized fluid to a safety valve 174 which in turn directs flow of pressurized fluid through line 173 to an actuator 165a which shifts the valve 165 against biasing of spring 165b to the energize position. Safety valve 174 is a commercially available item well known in the art to insure that an operator must actuate both of valves 169 and 170 simultaneously to insure that an operator's hands are away from moving machinery.

A second two way valve 175 is provided for controlling the operation of cylinder 140b. Valve 175 has an input line 176 in direct communication with the output of first regulator 160. In its first position, as shown in FIG. 16, valve 175 directs pressurized fluid flow from input line 176 to an output line 177 for pressurizing the head end of cylinder 140b. When shifted to the second position, the valve directs fluid flow from line 176 to line 178 to pressurize the rod end of cylinder 140b. With valve 175 in the first position, pressurized fluid is passed through line 177 to the head end of cylinder 140b causing cylinder 140b to extend.

Two actuators 179 and 180 act in response to pressurized fluid to shaft valve 175 between the first and second positions, respectively. Actuator 179 is in flow communication through line 181 with line 167 connected to valve 165. Accordingly, when valve 165 is in the first position, fluid flow passes from line 166 into line 167 and through line 181 to actuator 179 and places valve 175 in the first position as shown. Actuator 180 is connected via a line 182 to line 176 which is in flow communication with the output of regulator 16. Disposed within line 182 is a switch activated valve 183 which is biased by a spring 184 to the first position shown in FIG. 16 to block fluid flow through the valve 183. A switch member 185 on the valve is disposed within the apparatus and has a roller 185a (shown in FIGS. 1, 3 and 4) to be engaged by bearing mechanism 107a after carriage 107 has moved toward upper end 103a to a preset location. Upon achieving the preset location, bearing mechanism 107a engages roller 185a which trips switch 185 urging valve 183 against the bias of spring 184 to its second position with fluid flow passing through line 182 to actuator 180 causing valve 176 to shift to its second position. In the second position, valve 175 passes fluid flow through line 178 to the rod end of cylinder 140b. Upon disengagement between bearing mechanism 107a and switch 184, valve 183 returns to its first position thereby deactivating actuator 180. Valve 183 is fixedly secured to support plate 100 by a mounting bracket 183a shown best in FIGS. 1 and 4.

A third two-way valve 186 is provided having an input line 187 in direct flow communication with the output of first regulator 160. In the first position, valve 186 passes pressurized fluid to flow through a line 188 to the head end of cylinder 140a. In the second position, the valve 186 passes fluid flow from line 187 into line 189 to pressurize the rod end of cylinder 140a. Third valve 186 includes actuators 190 and 191 for shifting the valve between the first and second positions, respectively. Actuator 190 is in flow communication with line 178 such that valve 186 is urged to the first position shown in FIG. 16 when valve 175 is in its second position and cylinder 140b has become fully retracted. Actuator 191 is in flow communication through line 192 with valve 165 to be energized when valve 165 is in its second position.

Having described in detail the apparatus of the present invention and the pneumatic circuitry for effecting the movements of the various elements, the method of the present invention will now be described to form a crimp seal pleated filter assembly.

With the apparatus in its rest position as shown in FIGS. 1-7, a frame half 40 is deposited within the recess 111b of jig 111. A mating base member 20 is deposited in the recess 113b of jig 113 and retained therein by spring clips 115. A pre-sized sheet 60 of filter media is disposed within the pockets 19a' and 19a" of jig 19. In the rest position, the relative positioning of material 60, base member 20, frame member 40 and the blades and jigs of the apparatus are shown in greater detail in FIG. 8.

Figure 9:
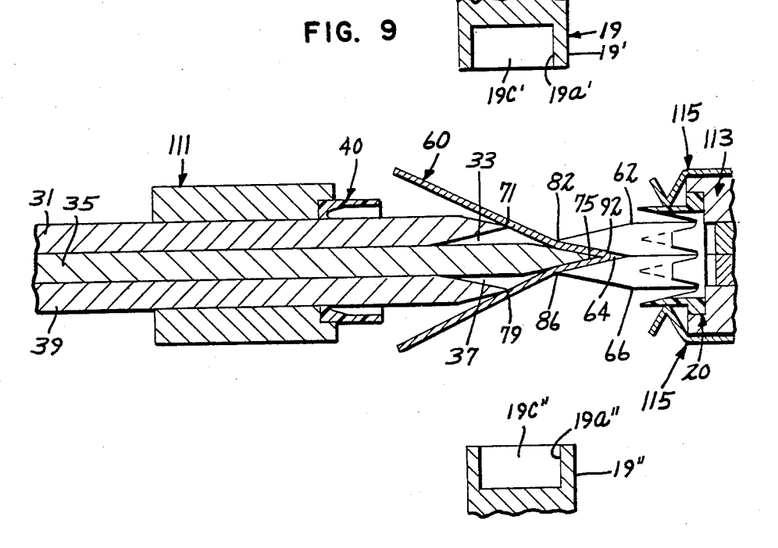

With base half 20, frame half 40 and sheet 60 so installed, an operator engages each of valves 169 and 170 with both hands thereby permitting pressurized fluid flow through the valves and through safety valve 174 onto the actuator 165a of valve 165. To keep valve 165 shifted to its second position, the operator must keep pressure on each of valves 169 and 170. With valve 165 actuated, fluid flow is simultaneously passed to the head end of cylinder 140 and actuator 191 of valve 186. Accordingly, valve 186 is shifted to its second position with pressurized fluid flow passing to the rod end of cylinder 140a. As a result of energizing valves 165 and 186, cylinder 140 moves to its extended position and cylinder 140a moves to its retracted position. Accordingly, carriages 109 moves toward upper end 103a of the apparatus and carries with it jig 113 to expose blades 62 and 66 as shown in FIG. 9. Simultaneously, carriage 107 moves toward upper end 103a with spring 128 causing carriage 106 to move simultaneously until center blade 35 urges filter media sheet 60 against blades 62 and 66 as shown in FIG. 9. In FIG. 9, a first pleat 92 is formed in media 60 by blade edge 75 engaging the pleat forming space 64 defined between center blades 62 and 66 thereby folding the media between the blades. As blade edge 75 engages the media against blades 62 and 66, resistance is encountered to further movement of center blade 35 by engagement of stop nuts 133 with stop plate 131. As a result of this resistance to further motion, as carriage 107 continues to move toward upper end 103a, spring 128 expands such that center blade 35 remains in a fixed position while outer blades 31 and 39 continue to advance toward the opposing fixed blades 62 and 66. As outer blades 31, 39 continue to advance toward the media 60, blade edges 71, 79 fold the media 60 around blade edges 82 and 86 of fixed blades 62, 66 to form a pair of adjacent pleats 91, 93 on each side of center pleat 92 as shown in FIG. 10.

Figure 10:
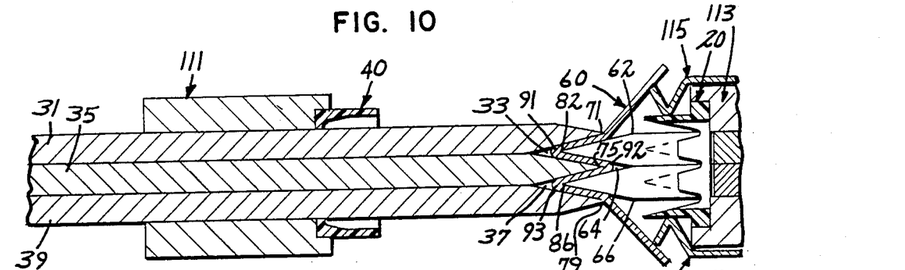

Switch activated valve 183 is positioned such that roller 185a is impacted when carriage 107 travels to a position with blades 31 and 39 advanced as shown in FIG. 10. Accordingly, when the apparatus achieves the positioning of FIG. 10, valve 183 is energized which passes pressurized fluid to actuator 180 to shift valve 175 to the second position. So shifted, valve 175 passes pressurized fluid from line 176 into line 178 for pressurizing the rod end of cylinder 140b causing cylinder 140b to retract.

Figure 11:
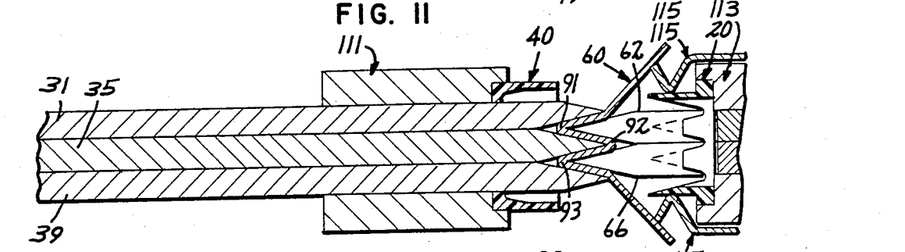
Figure 12:
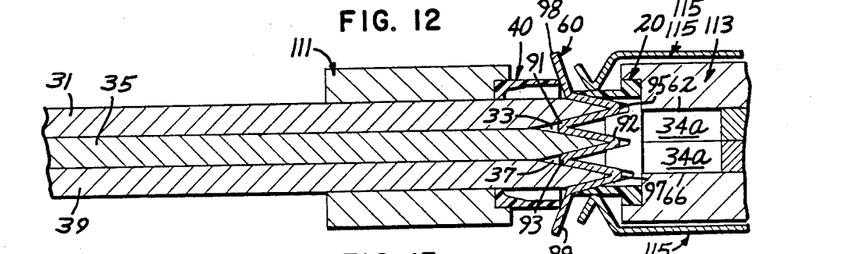
Figure 13:
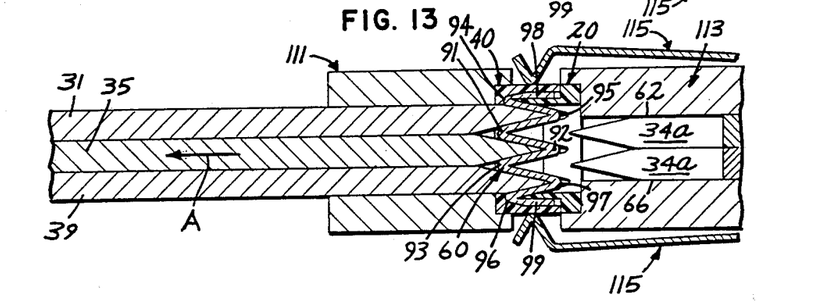

As cylinder 140b retracts, carriage 108 moves with it toward end 103a thereby drawing jig 111 and frame half 40 toward jig 113 and base half 20, with jig 11 assuming the position shown in FIGS. 11-13. When jig 111 reaches the position shown in FIG. 11, cylinder 140b is fully retracted as controlled by stop 152 and the rod end is fully pressurized. At this point, pressure in line 178 is sufficient to trip actuator 190 urging valve 186 to the position shown in FIG. 16 with pressurized fluid admitted to the head end of cylinder 140a. As cylinder 140a extends, jig 113 moves toward jig 111 and pleats 95 and 97 are formed between blades 71, 79 and side blade walls 26 as shown in FIG. 12. Additionally, end pleats 94 and 96 are formed between the outer blade edges 71 and 79 and outer edges of the side wall blades 26 of frame half 20. As seen in FIG. 12, formation of end pleats 94 and 96 produces a pair of outboard end flaps 98 and 99 extending outwardly away from side wall blades 26. Shown in FIG. 12, the base half 20 and frame half 40 are in near engagement. The near engagement prior to completion of the assembly is necessary to avoid sheering-off the outboard end flaps 98, 99. Also, the near engagement places the filter pleats in substantially final alignment with the base 20 and frame 40.

As cylinder 140a extends causing carriage 109 to move jig 113 and base half 20 to the position shown in FIG. 12, L-shaped bracket 147 abuts end 158 of push bar 155. Since the pressure in line 188 feeding cylinder 140a is greater than the pressure in line 168 feeding cylinder 140, L-shaped bracket 147 urges push bar 155 toward bottom end 103 thereby causing blade 35 to move rearwardly and to disengage valve 183. The slot defining surfaces of blade 35 engage spacer 125 so that blades 31 and 39 also move in the direction of the arrow A of FIG. 13.

Simultaneous with the retraction of blades 31, 35 and 39, cylinder 140a is also urging base half 20 into frame half 40 to crimp seal and encapsulate the media 60 with pleats, 91, 92, 93, 94, 95, 96 and 97 engaged between interlocking projections 50 and 30 and outboard end flaps 98 and 99 are crimp sealed and encapsulated between side blades 26 front and back walls 42, 44 of the housing frame as shown in FIG. 13. During the crimp seal operation cylinder 140a acts against the urging of cylinder 140b with movement of the jigs 111 and 113 stopped when the crimp seal operation is completed. Stoppage of motion signals the operator to remove engagement of cylinders 169 and 170. Accordingly, cylinder 140a completes its stroke, actuator 165a is unpressurized and valve 165 is urged to its rest position by spring 165b. In the rest position, fluid is sent under pressure to actuator 179 thereby urging valve 175 to its rest position. Accordingly, fluid is admitted under pressure to the head end of cylinder 140b and the rod end of cylinder 140. Therefore, cylinder 140 and 140b retract and extend, respectively.

Figure 14:
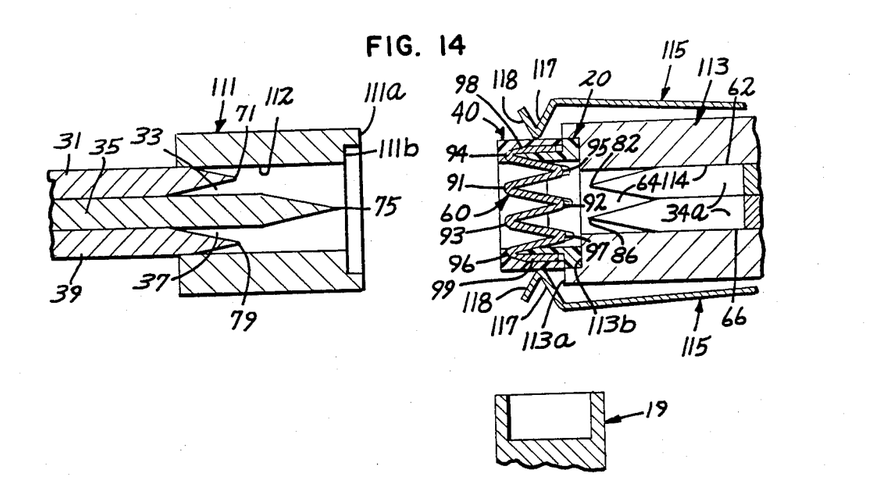

As cylinder 140 retracts, blades 31, 35 and 39 move to their rest position as shown in FIG. 14. Simultaneously, cylinder 140b extends causing carriage 108 to move toward bottom end 103 urging jig 111 away from jig 113. Spring clips 115 captured on the outside edges of frame member 40 carry the completed filter assembly on jig 113 where it may be grasped by an operator and removed. Accordingly, the cycle is completed with all elements in the rest position ready for a subsequent cycle.

Figure 15:
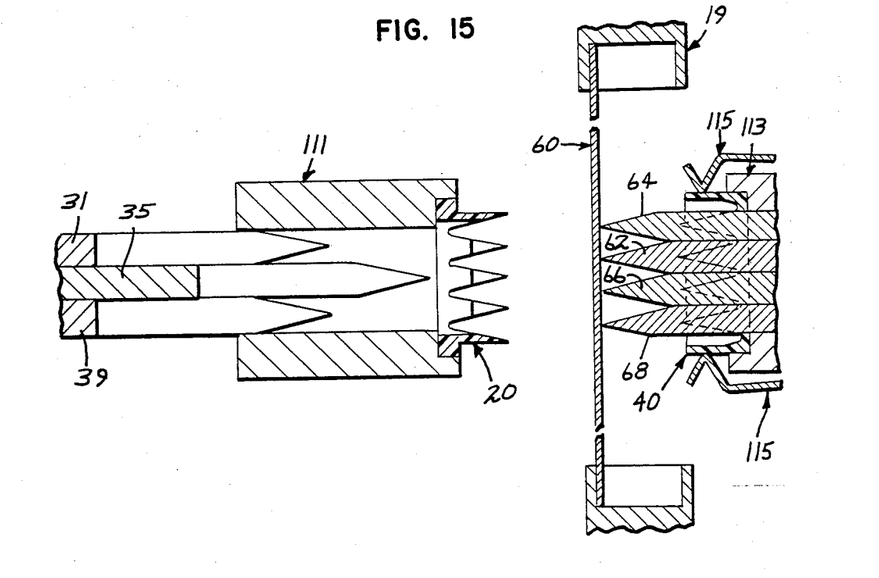
FIG. 15 is a diagramatic sectional view of an alternate pleat forming blade configuration for formation of a filter assembly having an additional set of pleats with an apparatus embodying the principles of the present invention.

The foregoing description has focused on a filter assembly having pleats formed by two sets of blades with the first set including three blades and the second set including two opposing blades. An alternative embodiment is shown in FIG. 15 which provides for formation of a filter assembly with an additional set of pleats. As shown in FIG. 15, a second pair of outer blades 64, 68 are provided on the sides of fixed center blades 62, 66. Addition of the second pair of outer blades 64, 68 requires reversal of the base 20 and frame 40 of the filter assembly in order to properly form end pleats of the filter media. It is to be understood that one skilled in the art can apply the principles of the present invention to form a filter assembly with any number of additional sets of pleats. Further, it will be appreciated that one skilled in the art can adapt the present invention such that only a single pair of pleat forming blades opposes one pleat forming blade. In addition to forming a filter assembly with fewer filter pleats, an embodiment of the present invention with a total of three blades may be used solely as a filter media pleater.

From the foregoing detailed description of the present invention, it has been shown how the objects of the invention have been obtained in a preferred manner. However, modifications and equivalents of the disclosed concepts such as readily occur to those skilled in the art are intended to be included in the scope of this invention. Thus, the scope of this invention is intended to be limited only by the scope of the claims as are or may hereafter be appended hereto.

What is claimed is:

1. A method for making a filter assembly including a crimp sealed and encapsulated filter element, comprising the steps of:

positioning a first half and a second half of a filter assembly housing in oppositely disposed and cooperatively aligned first and second supporting means, respectively;

positioning a filter media between the first and second halves of said filter assembly housing, one half of said filter assembly housing including a front wall and back wall which overlap a pair of side wall blades on the second half of the housing when said housing is assembled;

forming a center pleat in said media by folding said media between a slidable center pleating blade having a pleat forming blade edge which moves toward said media from one of said supporting means and an oppositely disposed and cooperatively aligned pair of center blades having pleat forming edges extending from said other supporting means toward said media;

forming additional pleats on each side of said center pleat by folding said media between oppositely disposed and cooperatively aligned pairs of pleating blades, said additional pleats being formed by said pair of center blades and a first pair of slidable outer pleating blades having one blade adjacent each side of said center pleating blade;

forming a pair of end pleats between a final pair of blades extending from one of said supporting means and said pair of side wall blades on one of said housing halves;

moving said first and second filter assembly housing halves into near engagement with each other with said media pleats in substantially final alignment with said first and second housing halves; and pushing said first and second filter assembly housing halves together, thereby crimp sealing and encapsulating said pleated media in said filter assembly housing.

2. The method of claim 1 wherein said first and second housing halves are moved into said near engagement to each other during formation of said end pleats.

3. A method for making a filter assembly including a crimp sealed and encapsulated filter element, comprising the steps of:

positioning a base half and a frame half of a filter assembly housing on oppositely disposed and cooperatively aligned base and frame supporting means, respectively;

positioning a filter media between the base and frame halves of said filter assembly housing, the frame half of said filter assembly housing including a front wall and a back wall which overlap a pair of said wall blades on the base half of the housing when said housing is assembled;

forming a center pleat in said media by folding said media between a slidable center pleating blade having a pleat forming blade edge extending outwardly toward said media from said frame supporting means and an oppositely disposed and cooperatively aligned pair of fixed pleating blades extending from said base supporting means toward said media;

forming a pair of additional pleats one on each side of said center pleat by folding said media between said pair of fixed pleating blades and a pair of slidable outer pleating blades one of each being positioned adjacent said center pleating blade, said pair of slidable outer pleating blades extending outwardly toward said media from s aid frame supporting means;

forming a pair of end pleats between said pair of outer pleating blades and the side wall blades on the base half of said filter assembly housing, moving said base and frame halves into near engagement with each other with said media pleats in substantially final alignment therewith during formation of said end pleats;

pushing said body and the frame halves of said filter assembly housing together, thereby crimp sealing and encapsulating said media in said filter assembly housing; and retracting said three slidable blades and frame supporting means, thereby releasing said filter media and housing therefrom.

4. The method according to claim 3 wherein both said base and frame supporting means are slidable and said step of pushing said base and frame halves together into final engagement involves pushing said base supporting means into said frame supporting means.

5. The method according to claim 3 wherein said step of retracting said three slidable blades and frame supporting means includes retaining said filter assembly with at least one clip on said base supporting means.

6. The method according to claim 3 in which said supporting means are jigs.

* * * * *